United States Patent
Li et al.

(10) Patent No.: US 11,620,984 B2
(45) Date of Patent: Apr. 4, 2023

(54) HUMAN-COMPUTER INTERACTION METHOD, AND ELECTRONIC DEVICE AND STORAGE MEDIUM THEREOF

(71) Applicant: BEIJING DAJIA INTERNET INFORMATION TECHNOLOGY CO., LTD., Beijing (CN)

(72) Inventors: Meizhuo Li, Beijing (CN); Yuanyuan Zhao, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 216 days.

(21) Appl. No.: 17/011,158

(22) Filed: Sep. 3, 2020

(65) Prior Publication Data

US 2021/0065682 A1    Mar. 4, 2021

(30) Foreign Application Priority Data

Sep. 3, 2019    (CN) .......................... 201910829244.3

(51) Int. Cl.
*G10L 15/08* (2006.01)
*G10L 15/06* (2013.01)
(Continued)

(52) U.S. Cl.
CPC .......... *G10L 15/063* (2013.01); *G06N 3/0454* (2013.01); *G10L 15/16* (2013.01);
(Continued)

(58) Field of Classification Search
CPC . G10L 15/063; G10L 15/16; G10L 2015/025; G10L 2015/088; G10L 15/04;
(Continued)

(56) References Cited

U.S. PATENT DOCUMENTS 10,586,540 B1 *    3/2020    Smith ...................... G10L 15/08
10,958,600 B1 *    3/2021    Annadata ................ H04L 51/02
(Continued)

FOREIGN PATENT DOCUMENTS

CN    107871506 A    4/2018
CN    108257616 A    7/2018
(Continued)

OTHER PUBLICATIONS

First Office Action of Chinese Patent Application No. 201910829244. 3—14 pages (dated Sep. 3, 2020).
(Continued)

*Primary Examiner* — Abdelali Serrou
(74) *Attorney, Agent, or Firm* — Knobbe, Martens, Olson & Bear, LLP

(57) ABSTRACT

A human-computer interaction method can include detecting a voice input, and determining whether a first detected voice includes a wake-up word, the wake-up word being intended to wake up an avatar in a social interaction client; displaying the avatar on a live streaming room interface provided by the social interaction client, in response to determining that the first detected voice includes the wake-up word; continuing to detect a voice input, and determining a recognition result by recognizing a second detected voice; determining a user intention based on the recognition result; and controlling, based on the user intention, the avatar to output feedback information.

16 Claims, 5 Drawing Sheets

(51) Int. Cl.
*G06N 3/04* (2023.01)
*G10L 15/16* (2006.01)
*H04N 7/15* (2006.01)
*G10L 15/02* (2006.01)

(52) U.S. Cl.
CPC ....... *H04N 7/157* (2013.01); *G10L 2015/025* (2013.01); *G10L 2015/088* (2013.01)

(58) Field of Classification Search
CPC ... G10L 2015/223; G10L 15/22; G10L 25/87; G10L 2015/225; G10L 15/00; G10L 15/01; G10L 15/08; G10L 15/26; G10L 15/05; G10L 17/22; G10L 13/00; G10L 15/18; G10L 2025/783; G10L 25/78; G10L 15/1815; G10L 15/19; G10L 15/30; G10L 17/26; G10L 15/02; G10L 15/07; G10L 15/1822; G10L 15/183; G10L 17/00; G10L 17/04; G10L 17/06; G10L 25/93; G10L 15/10; G10L 15/142; G10L 15/20; G10L 15/222; G10L 15/28; G10L 2015/227; G06N 3/0454; G06N 3/0445; G06N 7/005; G06N 3/08; H04N 7/157
See application file for complete search history.

(56) References Cited

U.S. PATENT DOCUMENTS

| | | | | |
|---|---|---|---|---|
| 11,037,372 | B2* | 6/2021 | Charlton | G06T 19/003 |
| 11,076,039 | B2* | 7/2021 | Weinstein | H04L 51/18 |
| 11,250,844 | B2* | 2/2022 | Mont-Reynaud | G10L 15/22 |
| 2005/0114132 | A1 | 5/2005 | Hsu | |
| 2006/0077205 | A1* | 4/2006 | Guymon | H04L 51/04 |
| | | | | 345/473 |
| 2016/0191958 | A1* | 6/2016 | Nauseef | G06V 40/20 |
| | | | | 725/116 |
| 2019/0043481 | A1* | 2/2019 | Georges | G10L 15/063 |
| 2019/0094981 | A1* | 3/2019 | Bradski | G06F 3/017 |
| 2019/0139545 | A1* | 5/2019 | Yuan | G10L 15/08 |
| 2019/0214005 | A1* | 7/2019 | Abdallah | G06Q 30/0202 |
| 2019/0318759 | A1* | 10/2019 | Doshi | G10L 15/04 |
| 2019/0385594 | A1* | 12/2019 | Park | G10L 15/22 |
| 2020/0349927 | A1* | 11/2020 | Stoimenov | G10L 15/16 |
| 2020/0380020 | A1* | 12/2020 | Layton | G06F 16/9535 |

FOREIGN PATENT DOCUMENTS

| | | |
|---|---|---|
| CN | 108428448 A | 8/2018 |
| CN | 109584896 A | 4/2019 |
| CN | 110033776 A | 7/2019 |
| CN | 110047471 A | 7/2019 |

OTHER PUBLICATIONS

Second Office Action of Chinese Patent Application No. 201910829244. 3—11 pages (dated Dec. 11, 2020).

* cited by examiner

HUMAN-COMPUTER INTERACTION METHOD, AND ELECTRONIC DEVICE AND STORAGE MEDIUM THEREOF

The present disclosure claims priority to Chinese Patent Application No. 201910829244.3, filed on Sep. 3, 2019 and entitled "HUMAN-COMPUTER INTERACTION METHOD AND APPARATUS, AND ELECTRONIC DEVICE AND STORAGE MEDIUM THEREOF", the disclosures of which are incorporated herein by reference in its entirety.

TECHNICAL FIELD

The present disclosure relates to the field of the Internet technologies, and more particularly, relates to a human-computer interaction method, and an electronic device and a storage medium thereof.

BACKGROUND

With the development of the Internet technologies, many social interaction clients have been born, such as a video interaction client, an instant messaging client, and an audio sharing client. Compared with a tool-type client, the social interaction client imposes higher requirements on the interestingness of a human-computer interaction process.

SUMMARY

The present disclosure provides a human-computer interaction method, and an electronic device and a storage medium thereof. The technical solutions of the present disclosure are summarized as follows.

According to an aspect of embodiments of the present disclosure, a human-computer interaction method is provided. The method is applicable to a social interaction client and includes:

detecting a voice input, and determining whether a first detected voice includes a wake-up word, the wake-up word being intended to wake up an avatar in the social interaction client;

displaying the avatar on a live streaming room interface provided by the social interaction client, in response to determining that the first detected voice includes the wake-up word;

continuing to detect a voice input, and determining a recognition result by recognizing a second detected voice;

determining a user intention based on the recognition result; and controlling, based on the user intention, the avatar to output feedback information.

According to another aspect of embodiments of the present disclosure, an electronic device is provided. The electronic device includes:

a processor;

a memory configured to store at least one instruction executable by the processor therein;

wherein the processor, when executing the at least one instruction, is enabled to perform the following steps:

detecting a voice input, and determining whether a first detected voice includes a wake-up word, the wake-up word being intended to wake up an avatar in the social interaction client;

displaying the avatar on a live streaming room interface provided by the social interaction client, in response to determining that the first detected voice includes the wake-up word;

continuing to detect a voice input, and determining a recognition result by recognizing a second detected voice;

determining a user intention based the recognition result; and controlling, based on the user intention, the avatar to output feedback information.

According to yet another aspect of embodiments of the present disclosure, a storage medium storing at least one instruction therein is provided. The at last one instruction, when executed by a processor of an electronic device, enables the electronic device to perform the following steps:

detecting a voice input, and determining whether a first detected voice includes a wake-up word, the wake-up word being intended to wake up an avatar in the social interaction client;

displaying the avatar on a live streaming room interface provided by the social interaction client, in response to determining that the first detected voice includes the wake-up word;

continuing to detect a voice input, and determining a recognition result by recognizing a second detected voice;

determining a user intention based on the recognition result; and controlling, based on the user intention, the avatar to output feedback information.

According to yet another aspect of embodiments of the present disclosure, a computer program product is provided. The computer program product, when running by a processor of an electronic device, enables the electronic device to perform the following steps:

detecting a voice input, and determining whether a first detected voice includes a wake-up word, the wake-up word being intended to wake up an avatar in the social interaction client;

displaying the avatar on a live streaming room interface provided by the social interaction client, in response to the wake-up word in the first detected voice;

continuing to detect a voice input, and determining a recognition result by recognizing a second detected voice;

determining a user intention based on the recognition result; and controlling, based on the user intention, the avatar to output feedback information.

BRIEF DESCRIPTION OF DRAWINGS

The accompanying drawings incorporated in the description and forming a part thereof illustrate the embodiments of the present disclosure and are used to explain the principle of the present disclosure along therewith, without constituting an improper limitation to the present disclosure.

DESCRIPTION OF EMBODIMENTS

Figure 1:
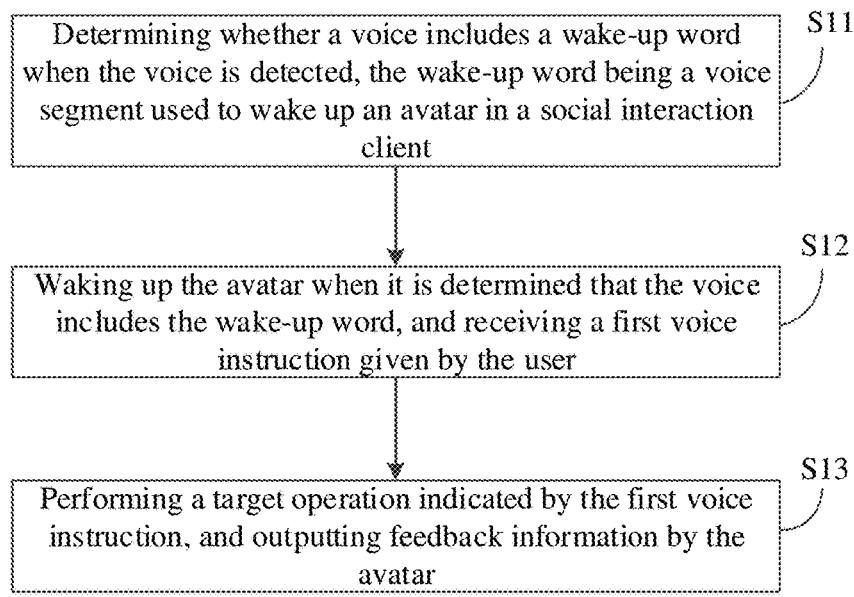
FIG. 1 is a flowchart of a human-computer interaction method according to an embodiment of the present disclosure.

In order to make a person of ordinary skill in the art better understand the technical solutions of the present disclosure, the technical solutions in the embodiments of the present disclosure are described clearly and completely below with reference to the accompanying drawings.

It should be noted that the terms "first", "second", and the like in the description and claims and the above description of the accompanying drawings of the present disclosure are used to distinguish similar objects, and not necessarily used to describe a specific order or a sequential order. It should be understood that the data used in this way are interchangeable under appropriate circumstances, such that the embodiments of the present disclosure described herein can be implemented in a sequence other than those illustrated or described herein. The implementations set forth in the following description of example embodiments do not represent all implementations consistent with the present disclosure. Instead, they are merely examples of apparatuses and methods consistent with some aspects of the present disclosure as recited in the appended claims.

The user information involved in the present disclosure refers to information authorized by users or fully authorized by all parties.

Embodiments of the present disclosure provide a human-computer interaction method and apparatus, and an electronic device and a storage medium thereof.

A subject of performing the human-computer interaction method according to the embodiment of the present disclosure is a human-computer interaction apparatus, which is applicable to the electronic device. In some embodiments, the human-computer interaction apparatus is a software function module of a social interaction client in the electronic device. In some embodiments, the electronic device is a smart phone, a tablet device, a notebook computer, a desktop computer, an entertainment device, a game device, a medical device, a fitness device, a personal digital assistant, or the like.

The human-computer interaction method according to the embodiment of the present disclosure can be applicable to various application scenarios in the social interaction client, such as a live streaming scenario, an audio and video playback scenario, and a human-computer chat scenario.

In some embodiments, an implementation environment involved in the human-computer interaction method includes: an electronic device and a server. In some embodiments, the electronic device is connected to the server over a wireless network or a wired network.

In some embodiments, a social interaction client is installed and operated on the electronic device. In addition, the electronic device generally refers to one of a plurality of electronic devices, and the electronic device is merely described in the present embodiment as an example. It will be understood by a person skilled in the art that the number of the above-described electronic devices can be more or less. For example, there are only a few electronic devices, or there are dozens or hundreds of electronic devices, or more. The number and device types of the electronic devices are not limited in embodiments of the present disclosure. In addition, the server is at least one of a server, a plurality of servers, a cloud computing platform, and a virtualization center, which is not limited in the embodiments of the present disclosure.

In some embodiments, the meaning of A and/or B includes three cases of both A and B, only A, and only B.

In some embodiments, an avatar refers to an intelligent robot that can interact with a user in the social process. The avatar is based on an Artificial Intelligence (AI) technology, is represented as a virtual character or a virtual animal at the front-end, and can interact with the user by voice to achieve the sense of reality of simulating a communication with human beings.

Taking the application of the AI technology in a live streaming room scenario as an example, after the avatar is woken up, an anchor can open or use a live streaming room function by voice instead of clicking on a page to enable this function. Further, in addition to the live streaming room function, the avatar also supports chat modes such as viewing the weather, telling jokes, complimenting the anchor, or telling stories. In addition, the avatar can also interact with audience users according to the requirements of the anchor, such as complimenting the audience users, applauding, cheering, and sending virtual hugs to the audience users (including, but not limited to the above example scenarios). In addition, when the anchor does not wake up the avatar, the avatar can actively remind or recommend the anchor to use the live streaming room function, and at the same time, can receive feedback from the anchor at any time and enable corresponding functions.

In some embodiments, the human-computer interaction scheme provided by the embodiment of the present disclosure includes steps such as: voice wake-up, voice endpoint detection, real-time voice recognition, query parsing and scenario classification, intention understanding, and voice synthesis. Taking the application of the AI technology in the live streaming room scenario as an example, an intelligent robot behaved as an avatar at the front-end listens to the anchor at all times. Once a wake-up word is heard, the intelligent robot enters a voice pickup mode. In order to determine whether the current speaker's expression is complete, the present disclosure includes a voice endpoint detection step to determine whether the intelligent robot needs to make a response. After endpoint detection, a voice of the anchor is recognized, and a recognition result is given by a voice recognition model. Q&A parsing and scenario classification are then performed based on the recognized text. Next, intention understanding is performed based on the results of Q&A parsing and scenario classification. Voice synthesis is then performed according to content of intention understanding. The intelligent robot gives a feedback voice and feedback behaviors, such as playing a song.

FIG. 1 is a flowchart of a human-computer interaction method according to an embodiment of the present disclosure. The human-computer interaction method is applicable to a social interaction client. As shown in FIG. 1, the human-computer interaction method includes the following steps.

In step S11, when a voice is detected, whether a detected voice includes a wake-up word is determined. The wake-up word is a voice segment intended to wake up an avatar in the social interaction client.

This step involves detecting a voice input and determining whether the detected voice includes the wake-up word. For the sake of differentiation, the voice signal here is called a first detected voice in the description. In some embodiments, the social interaction client includes one or more avatars, and different avatars have different wake-up words. In practical applications, when the social interaction client includes a plurality of avatars, the user is supported to predesignate one avatar in the social interaction client. In this way, when the social interaction client detects the voice, it is determined whether the detected voice includes the wake-up word of the avatar designated by the user. When the user does not designate an avatar in the social interaction client, the social interaction client can also set a default avatar. Correspondingly, when a voice is detected, the social interaction client determines whether the detected voice includes the wake-up word of the default avatar.

In some embodiments, the social interaction client detects voice on an environment where it is located. In addition, the social interaction client may detect the voice in a plurality of ways. In some embodiments, voice pickup starts whenever the social interaction client detects sound energy. During a voice pickup process, whether a silent segment longer than a preset duration appears is detected. When the silent segment longer than the preset duration appears, the voice pickup is terminated. Whether a sound segment picked up during the pickup process is a voice fragment is determined. If the sound segment picked up during the voice pickup period is the voice segment, it is determined that the sound segment picked up during the voice pickup period is a piece of voice.

In some embodiments, whether the sound segment picked up during the voice pickup process is the voice segment is determined in such a manner: the sound fragment picked up during the voice pickup process is subjected to voice activity detection, for example, the voice activity detection is performed by using a voice activity detection method shown in Annex B of the G.729 protocol of International Telecommunication Union Telecommunication Standardization Sector (ITU-T). It is not limited to this case, and any method that may achieve voice activity detection may be applicable to the present disclosure.

In addition, there are many implementations to determine whether a wake-up word is included in a voice. In order to make the solution and the layout clear, the implementation of determining whether a wake-up word is included in a voice is exemplified hereinafter.

In some embodiments, taking the application of the AI technology in a live streaming room scenario as an example, the user mentioned in the embodiments of the present disclosure is an anchor, and step S11 is replaced with: detecting a voice input, and determining whether a first detected voice includes a wake-up word, wherein the wake-up word is intended to wake up an avatar that appears in a live streaming room in a social interaction client.

In step S12, when the voice contains the wake-up word, the avatar is woken up, and a first voice instruction given by the user is received.

In some embodiments, waking up the avatar includes: outputting a short message in response to the wake-up word in a short message output area designated for the avatar (also referred to as a designated short message output area) while displaying the avatar on an interface of the social interaction client; or outputting a voice in response to detecting that the voice includes the wake-up word using a timbre designated by the avatar while displaying the avatar on the interface of the social interaction client; or outputting the voice and the short message in response to the wake-up word while displaying the avatar on the interface of the social interaction client.

In some embodiments, taking the application of the AI technology in the live streaming room scenario as an example, waking up the avatar includes: outputting a short message of the avatar in the designated short message output area on the live streaming room interface provided by the social interaction client while displaying the avatar on the live streaming room interface, wherein the short message is intended to respond to the wake-up word; or outputting a voice of the avatar in a live streaming room using a timbre designated by the avatar while displaying the avatar on the live streaming room interface provided by the social interaction client, wherein the voice of the avatar is intended to respond to the wake-up word; or outputting the voice and the short message of the avatar while displaying the avatar on the live streaming room interface provided by the social interaction client.

In some embodiments, a first voice instruction given by the user may be received in a plurality of ways. In some embodiments, receiving the first voice instruction given by the user includes: opening a voice pickup function; detecting whether a voice endpoint appears during the voice pickup process, wherein the voice endpoint is intended to indicate the end of the voice; terminating the voice pickup in response to detecting the voice endpoint, and determining the second detected voice based on the voice pickup function. In some embodiments, the second detected voice is the first voice instruction in the embodiments of the present disclosure.

In practical applications, whether a voice endpoint appears may be detected in a plurality of ways. In order to make the solution and the layout clear, detecting whether a voice endpoint appears is exemplified hereinafter.

In step S13, a target operation indicated by the first voice instruction is performed, and feedback information is output by the avatar.

Steps S12 and S13 involve continuing to detect the voice input, performing voice recognition on the detected voice, determining the user intention based on an acquired voice recognition result, and then controlling the avatar to output feedback information based on the user intention. For the sake of differentiation, the voice here is called a second detected voice in the description.

The feedback information is intended to characterize an execution result of the target operation.

In some embodiments, the execution of the target operation indicated by the first voice instruction is completed by the social interaction client alone, or by the interaction between the social interaction client and the server.

In some embodiments, when the social interaction client receives the first voice command given by the user, a voice recognition model is intended to recognize a text corresponding to the first voice instruction; and further determine a target operation indicated by the text and performing the target operation.

In other embodiments, after the social interaction client receives the first voice instruction given by the user and recognizes the text corresponding to the first voice instruction by using the voice recognition model, the text is sent to the server such that the server determines the target operation indicated by the text. In addition, after the server determines the target operation, the social interaction client can also interact with the server to complete each sub-step required for the target operation.

In other embodiments, the social interaction client sends the first voice instruction directly to the server, such that the server recognizes the text corresponding to the first voice instruction by using the voice recognition model, and determines the target operation indicated by this text. Similarly, after the server determines the target operation, the social interaction client can also interact with the server to complete each sub-step required for the target operation.

In the above three implementations, a plurality of voice recognition models may be available in the case of performing voice recognition. In some embodiments, the voice recognition model such as a transformer model is not limited to this case. The transformer model is an end-to-end voice recognition model which is structurally characterized by consisting of an encoder and a decoder. The end-to-end means that the input of the model is a voice, and the output thereof is a recognized text. In some embodiments, the embodiments of the present disclosure perform voice recognition based on a streaming end-to-end voice recognition model (a transformer model). This technology comprehensively utilizes peak information of connectionist temporal classification (CTC) and a multi-head self-attention mechanism to achieve streaming decoding. Streaming refers to a task of recognizing while talking.

After the text is acquired by voice recognition, query parsing and scenario classification are performed to realize intention understanding.

In some embodiments, determining the target operation indicated by the text includes: acquiring a target operation category corresponding to the text, each keyword in the text, and a keyword category corresponding to each keyword by inputting the text to a third neural network model by the social interaction client or the server. An operation corresponding to the target operation category is the target operation indicated by the text.

In some embodiments, the implementation process of executing the target operation includes: by the social interaction client and/or the server, determining operation parameters based on the keywords under the target keyword category, and controlling the avatar based on the operation parameters. Keywords in the text refer to proper nouns, meaningful quantifiers and the like appearing in this text. A plurality of keyword categories is configured to classify the keywords appearing in this text according to meanings of the keywords and objects characterized by the keywords.

In some embodiments, a plurality of keyword categories are preset to be in one-to-one correspondence to the categories of executable operations in the social interaction client.

In some embodiments, the third neural network model is trained based on a plurality of sample text instructions and labeled information of each sample text instruction. The labeled information includes various keywords in the sample text instructions, a keyword category corresponding to each keyword, and an operation category corresponding to each keyword category.

In some embodiments, the third neural network model is an end-to-end model based on a self-attention mechanism, that is, query parsing and scenario classification are processed by an end-to-end model. The query parsing process includes but is not limited to keyword recognition and keyword classification. The scenario classification includes but is not limited to determining an operation category.

For clarity of the solution, an example is taken to describe the process of executing the target operation indicated by the first voice instruction. Assuming that a text corresponding to the first voice instruction given by the user is "play 'A Nice Day' of Zhang San", a target operation category corresponding to the text as "search and play a song", as well as two keywords "Zhang San" and "A Nice Day" is acquired by inputting this text into the third neural network model, wherein "Zhang San" corresponds to the keyword category of "singer", and "A Nice Day" corresponds to the keyword category of song's names. Then, searching for songs is performed with "Zhang San" and "A Nice Day" as search keywords. This song may be played after being found.

It should be noted that the foregoing implementation of executing the target operation indicated by the first voice instruction is merely an example and should not constitute a limitation to the present disclosure.

In addition, the feedback information outputted by the avatar includes: a feedback voice and/or a feedback short message. In some embodiments, the feedback short message is a plain text, or contains both a text and pictures or emoticons.

In some embodiments, controlling, based on the user intention, the avatar to output the feedback information includes: determining operation parameters based on the keywords under the target keyword category, and controlling the avatar based on the operation parameters, the target keyword category being a keyword category related to the target operation category; and outputting feedback information in the live streaming room by the avatar, the feedback information being intended to characterize an execution result of the operation.

In some embodiments, taking the application of the AI technology to a live streaming room scenario as an example, the feedback information can be outputted on the live streaming room interface by the avatar. Outputting the feedback information on the live streaming room interface by the avatar includes at least one of the followings:

outputting a feedback short message by the avatar in the designated short message output area on the live streaming room interface; and outputting a feedback voice in the live streaming room using a designated timbre configured for the avatar.

Figure 2:
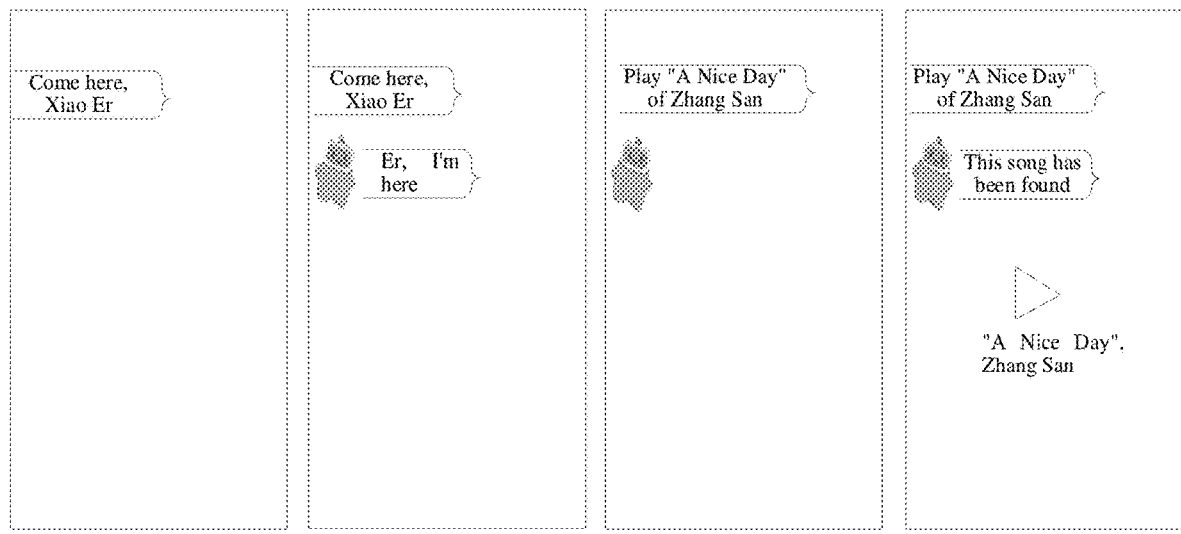
FIG. 2 is a schematic diagram of a human-computer interaction scenario according to an embodiment of the present disclosure.

FIG. 2 is a schematic diagram of a human-computer interaction scenario according to an embodiment of the present disclosure. This human-computer interaction scenario is summarized as follows: in a social interaction client, a user wakes up an avatar and interacts with the avatar. As shown in FIG. 2, when a voice "Come here, Xiao Er" containing a wake-up word "Xiao Er" is detected, the avatar Xiao Er is displayed on an interface of the social interaction client. In addition, the avatar Xiao Er outputs a short message "Well, I am here" in response to the wake-up word. The user then gives a first voice instruction "play "A Nice Day" of Zhang San". A target operation indicated by the first voice instruction is performed, that is, the song "A Nice Day" sung by singer Zhang San is searched and played. The song may be played when being found, and the avatar may output a feedback short message of "this song has been found"; or a feedback voice with the content of "this song has been found" is played using a timbre of the avatar.

In the interaction scenario shown in FIG. 2, the voice given by the user or a text corresponding to the first voice instruction is displayed in the social interaction client, which can facilitate the user to confirm whether the voice given by the user or the first voice instruction is clearly understood. In some embodiments, the voice given by the user or the text corresponding to the first voice instruction is not displayed in the social interaction client; or the voice given by the user or the first voice instruction is recorded as a piece of voice, and displayed on the interface shown in FIG. 2 in the form of an icon or link. In this way, when the user clicks on the relevant icon or link on the interface, the voice or the first voice instruction is played.

In practical applications, the feedback voice output by the avatar corresponds to a feedback text. The feedback voice is a voice acquired by performing voice synthesis on the feedback text. In some embodiments, a tractron+LPCNET model is intended to synthesize the feedback text into a feedback voice. Tractron is an acoustic model in voice synthesis, and is configured to convert a feedback text into an acoustic feature frame sequence. LPCNET is a voice synthesis vocoder network model based on improved signal processing, and is configured to convert the acoustic characteristic frame sequence output by tractron into a voice. The tractron+LPCNET model refers to a combined model of an acoustic model and a vocoder. The combined model is configured to map the input text to voice output. In other embodiments, a text in the feedback short message is used as a feedback text corresponding to the feedback voice.

By the human-computer interaction method according to the embodiment of the present disclosure, the interestingness of human-computer interaction in the social interaction client is improved by voice based on the combination of the avatar and the user.

In order to make the solution and the layout clear, the implementation of determining whether the wake-up word is included in the voice in step S11 is exemplified hereinafter.

In some embodiments, determining whether the picked-up voice includes the wake-up word includes:

acquiring a plurality of phoneme sequences by inputting the picked-up voice (the first detected voice) into a second neural network model, the plurality of phoneme sequences being formed by permutations and combinations of individual phonemes; and determining that this voice includes the wake-up word when the plurality of acquired phoneme sequences include a phoneme sequence matching the wake-up word;

wherein the second neural network model is trained based on a plurality of sample voices and phoneme sequences corresponding to each sample voice.

Assuming that a voice "ni hao xiao er" is input into the second neural network model, a plurality of phoneme sequences including: n i h ao, x i ao er, ni, x i ao, n i h ao x i ao, n i h ao x i ao er and n i er, and the like formed by the permutation and combination of respective phonemes in the phoneme sequence "n i h ao x i ao er" are acquired. Each phoneme in the phoneme sequence is each initial and final in this phoneme sequence. Assuming the wake-up word is "xiao er"; it is determined that this voice includes the wake-up word since the plurality of acquired phoneme sequences include the phoneme sequence "x i ao er" matching "xiao er".

In other embodiments, determining whether the picked-up voice includes the wake-up word includes:

converting the picked-up voice into a text; and determining that the voice includes the wake-up word when the converted text contains the text corresponding to the wake-up word.

The above-described voice recognition model is configured to convert the voice into the text, which is not repeated herein.

Next, detecting whether a voice endpoint appears during the process of receiving the first voice instruction given by the user is described.

In some embodiments, detecting whether the voice endpoint appears includes:

detecting whether a silent segment longer than a preset duration appears; and determining that the voice endpoint appears if the silent segment longer than the preset duration appears. The silent duration is predesignated, such as 5 seconds or 10 seconds, or the like, which is not limited in the present disclosure.

In other embodiments, detecting whether the voice endpoint appears includes:

detecting whether a silent segment longer than the preset duration appears; and detecting whether a third voice includes a complete sentence if the silent segment longer than the preset duration appears, wherein the third voice is a voice picked up before the silent segment.

It is determined that the voice endpoint appears when the third voice includes a complete sentence.

In some embodiments, detecting whether the third voice includes the complete sentence includes:

acquiring an output result by inputting the third voice to a first neural network model, the output result being intended to indicate whether the voice picked up before the salient fragment includes a complete sentence;

wherein the first neural network model is trained based on a plurality of sample voices and labeled information of each sample voice, the labeled information of each sample voice being intended to characterize whether a sentence corresponding to each sample voice is complete.

It is determined whether the sentence corresponding to the third voice is complete, which can avoid receiving a meaningless first voice instruction.

In some embodiments, the labeled information of the sample voices refers to a state sequence corresponding to the sample voices. The state sequence is acquired by performing state labeling on phonemes in a phoneme sequence corresponding to the sample voices.

In some embodiments, the states include a start state, an intermediate state, and an end state, which is not limited thereto. It is assumed that three states of phonemes are represented by 1, 2, and 3 respectively: a sample voice is "fang shou ge ba", and the phoneme sequence corresponding to this sample voice is "f ang sh ou g e b a"; then, the state sequence acquired by state labeling of the phonemes in the phoneme sequence is "f1 f2 f3 ang1 ang2 ang3 sh1 sh2 sh3 ou1 ou2 ou3 g1 g2 g3 e1 e2 e3 b1 b2 b3 a1 a2 a3". In this state sequence, the last state is a3. Since 3 represents the end state, it is indicated that the sample voice corresponding to the state sequence includes a complete sentence.

Upon completion of the training of the first neural network model, it is assumed that a voice "wo xiang" is input to the trained first neural network model, such that the state sequence of this voice "w1 w2 w3 of o2 o3 x1 x2 x3 it i2 i3 ang1 ang2" is acquired. Since the last state in the state sequence is ang2, it is determined that the sentence corresponding to this voice is incomplete.

In addition, in order to improve the capability of the first neural network model to detect a voice having an incomplete sentence, the sample voices used in the course of training the first neural network model are all sample voices having complete sentences. In this way, the trained first neural network model can easily recognize a voice having an incomplete sentence.

In some embodiments, the first neural network model is Minimum Gated Recurrent Unit (MGRU)+Hidden Markov Model (HMM). The input of the MGRU in the first neural network model is an acoustic feature frame sequence, and the output thereof is all possible state sequences. If N states are labeled, and the current voice has T phonemes as the input, then the current voice has N*T state sequences as the input. HMM learns jumps between states in these state sequences, and gives an optimal state sequence. When the last state in the output state sequence is not the end state, it is determined that the voice inputted into this model has an incomplete sentence.

In summary, detecting whether the voice endpoint appears during the process of receiving the first voice instruction given by the user is described.

The scenario where the user actively wakes up the avatar to perform a task by the wake-up word is introduced as above. In addition, the avatar may also actively remind a user or make a recommendation for the user. That is, in some embodiments, the human-computer interaction method according to the embodiment of the present disclosure further includes:

outputting recommendation information on an executable operation by an avatar when it is detected that a predetermined recommendation condition is satisfied; and performing the executable operation matching the recommendation information when a voice that a recommendation is accepted is detected.

That is, the recommendation information is outputted by the avatar in response to satisfying the recommendation condition; a voice input is detected, and the executable operation matching the recommendation information is performed based on a fourth detected voice, wherein the fourth detected voice includes a voice that an anchor accepts a recommendation. Based on a fifth detected voice, the avatar is hidden on a live streaming room interface, wherein the fifth detected voice includes a voice that the anchor does not accept a recommendation.

Taking the application of the AI technology in the live streaming room scenario as an example, the above recommendation process can be replaced with: outputting recommendation information by the avatar in response to satisfying a recommendation condition; and performing an executable operation matching the recommended information in response to receiving a second voice instruction, wherein the second voice instruction includes a voice that the anchor accepts a recommendation.

A plurality of predetermined recommendation conditions are configured. For example, when it is detected that the user has never used a function in the social interaction client, recommendation information that recommends an executable operation of this function is output by the avatar. For another example, when it is detected that the time comes when the user often uses a live streaming service, recommendation information on the start of a live streaming is output by the avatar. Taking the application of the AI technology in the live streaming room scenario as an example, the above-described recommendation conditions include but are not limited to: a live streaming room function that the anchor has never used existing in the social interaction client; or the current time being the time when the anchor uses the live streaming service.

In some embodiments, the recommendation information output by the avatar includes a recommendation voice and/or a recommendation short message.

Figure 3:
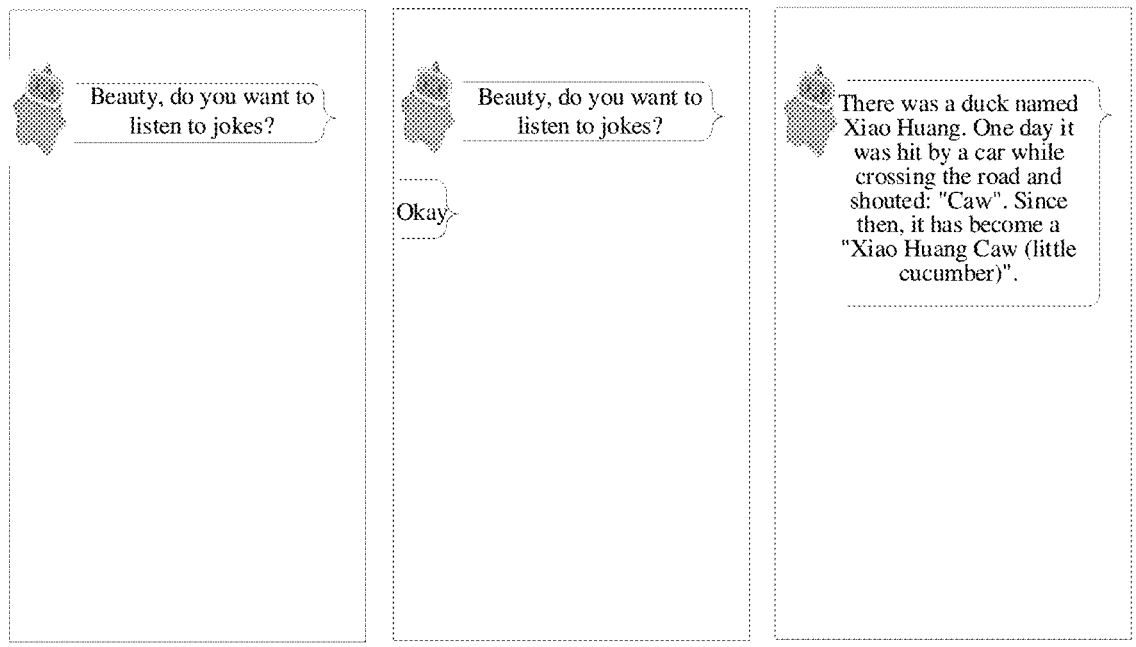
FIG. 3 is a schematic diagram of another human-computer interaction scenario according to an embodiment of the present disclosure.

FIG. 3 is a schematic diagram of another human-computer interaction scenario according to an embodiment of the present disclosure. The human-computer interaction scenario is a scenario where the avatar recommends an executable operation. As shown in FIG. 3, the avatar outputs recommendation information of "Beauty, do you want to listen to jokes?" When the voice "Okay" provided by the user to accept the recommendation is detected, a joke search operation is performed, and the searched joke is output by the avatar.

The scenario where the user actively wakes up the avatar to perform a task by the wake-up word is introduced as above. In addition, the avatar can also interact with users. That is, in some embodiments, the human-computer interaction method according to the embodiment of the present disclosure further includes:

playing an interactive voice designated for an avatar and corresponding to a predetermined interaction condition when it is detected that the predetermined interaction condition is satisfied; and/or, outputting an interactive short message corresponding to the interaction condition in a short message output area designated for the avatar.

Taking the application of the AI technology in a live streaming room scenario as an example, the above-described interaction process may be replaced with: performing, in response to satisfying the interaction condition, at least one of the followings:

playing an interactive voice designated for an avatar and corresponding to an interaction condition in a live streaming room;

outputting an interactive short message corresponding to the interaction condition by the avatar in a designated short message output area on a live streaming room interface; and playing an interactive animation designated for the avatar and corresponding to the interaction condition in the live streaming room.

In some embodiments, a plurality of predetermined interaction conditions are configured. For example, in step S12, when the avatar is woken up, the voice and/or short message in response to the wake-up word is output, which is a predetermined interaction condition. Alternatively, when the recommendation information on an executable operation is output by the avatar, and a voice that the recommendation is not accepted is detected, a voice of "Okay, I'm leaving" is played; and/or a short message of "Okay, I'm leaving" is output. Alternatively, when the user is live streaming, if it is detected that a user of another social interaction client sends a gift, an interactive voice appreciating the user who gave the gift may be played in the live streaming room interface; and/or an interactive short message appreciating the user who gave the gift is output.

Taking the application of the AI technology in the live streaming room scenario as an example, the above-described interaction conditions include but are not limited to the following cases: a wake-up word to wake up the avatar is received; a voice that the anchor does not accept a recommendation is detected after the recommendation information is output; and a virtual gift presented by an audience user in the live streaming room is received.

Figure 4:
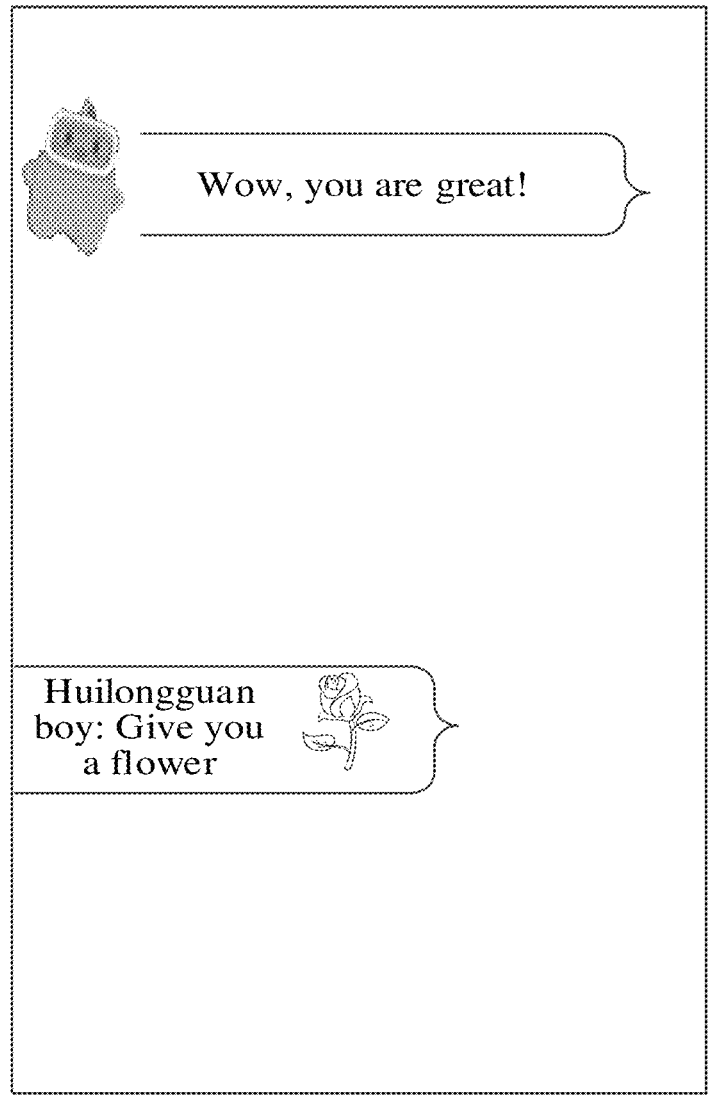
FIG. 4 is a schematic diagram of yet another human-computer interaction scenario according to an embodiment of the present disclosure.

FIG. 4 is a schematic diagram of yet another human-computer interaction scenario according to an embodiment of the present disclosure. The human-computer interaction scenario is a scenario where the avatar interacts with user's friends in the social interaction client. As shown in FIG. 4, if a gift from a user of another social interaction client is detected, an interactive short message "Wow, you are great!" appreciating the user who gave the gift is output by the avatar.

It should be noted that the above-described recommendation conditions and interaction conditions are merely examples and should not constitute a limitation to the present disclosure.

By the human-computer interaction method according to the embodiment of the present disclosure, the interestingness of human-computer interaction in the social interaction client is improved by voice based on the combination of the avatar and the users. In the live streaming room scenario, the embodiments of the present disclosure can achieve the following effects: an intelligent robot actively reminds the anchor by the avatar or outputs the recommendation information to the anchor; the intelligent robot can interact with audience users, e.g., when an audience user presents a virtual gift to the anchor; the anchor wakes up the avatar by the wake-up word, such that the avatar can perform tasks assigned by the anchor. In summary, according to the embodiments of the present disclosure, the linkage between voice recognition and the live streaming room functions is achieved, the interaction and interestingness of the live streaming room can be improved by voice and the avatar, and manual operations of the anchor can be reduced by voice.

Figure 5:
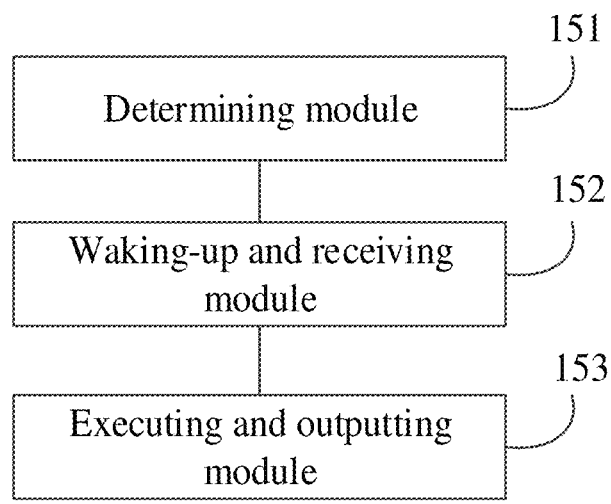
FIG. 5 is a block diagram of a human-computer interaction apparatus according to an embodiment of the present disclosure.

FIG. 5 is a block diagram of a human-computer interaction apparatus according to an embodiment of the present disclosure. Referring to FIG. 5, the apparatus includes a determining module 151, a waking-up and receiving module 152, and an executing and outputting module 153.

The determining module 151 is configured to detect a voice input, and determine whether a first detected voice includes a wake-up word, the wake-up word being intended to wake up an avatar in the social interaction client.

The waking-up and receiving module 152 is configured to display the avatar on a live streaming room interface provided by the social interaction client, in response to the wake-up word in the first detected voice, and continue to detect a voice input.

The executing and outputting module 153 is configured to determining a recognition result by recognizing a second detected voice, and determine a user intention based on the recognition result; and control, based on the user intention, the avatar to output feedback information.

In some embodiments, the executing and outputting module 153 is further configured to output a short message of the avatar in a designated short message output area on the live streaming room interface, the short message being intended to respond to the wake-up word; or output a voice of the avatar in the live streaming room using a designated timbre configured for the avatar, the voice of the avatar being intended to respond to the wake-up word; or output the voice and the short message of the avatar.

In some embodiments, the apparatus further includes a recommending and executing module.

The recommending and executing module is configured to output recommendation information by the avatar in response to satisfying a recommendation condition, detect a voice input, and perform, based on a fourth detected voice, an executable operation matching the recommendation information.

The fourth voice includes a voice that an anchor accepts a recommendation.

The recommendation condition includes: a live streaming room function that the anchor has never used existing in the social interaction client; or the current time being the time when the anchor uses the live streaming service.

In some embodiments, the recommending and executing module is further configured to hide the avatar on the live streaming room interface based on a fifth detected voice, the fifth detected voice including a voice that the anchor does not accept a recommendation.

In some embodiments, the apparatus further includes a playing module and/or an interactive outputting module.

The playing module is configured to play an interactive voice designated for the avatar and corresponding to the interaction condition in the live streaming room; or play an interactive animation of the avatar in the live streaming room, the interactive animation corresponding to the interaction condition.

The interactive output module is configured to output an interactive short message by the avatar in a designated short message output area on the live streaming room interface, the interactive short message corresponding to the interaction condition.

The interaction conditions include, but not limited to, the following cases: a wake-up word to wake up the avatar is received; a voice that the anchor does not accept a recommendation is detected after the recommendation information is output; and a virtual gift presented by the audience user in the live streaming room is received.

In some embodiments, the waking-up and receiving module is configured to:

open a voice pickup function, and detect whether a voice endpoint appears during the voice pickup process, the voice endpoint being intended to indicate the end of a voice; and terminate the voice pickup in response to detecting the voice endpoint, and determine the second detected voice based on the voice pickup function.

In some embodiments, to detect whether the voice endpoint appears, the waking-up and receiving module is specifically configured to:

detect whether a silent segment longer than a preset duration appears during the voice pickup process;

detect whether a third voice includes a complete sentence in response to the fact that the silent segment longer than the preset duration appears during the voice pickup process; and determine that the voice endpoint appears in response to detecting that the third voice includes a complete sentence;

wherein the third voice is a voice picked up before the silent segment.

In some embodiments, to detect whether the third voice includes the complete sentence, the waking-up and receiving module is specifically configured to:

acquire an output result by inputting the third voice to a first neural network model, the output result being intended to indicate whether the third voice includes a complete sentence;

wherein the first neural network model is trained based on a plurality of sample voices and labeled information of each sample voice, the labeled information being intended to characterize whether the sentence corresponding to each sample voice is complete.

In some embodiments, the determining module is configured to:

acquire a plurality of phoneme sequences by inputting the first detected voice into a second neural network model, the plurality of phoneme sequences being formed by permutations and combinations of individual phonemes; and determine that the first detected voice includes the wake-up word in response detecting that the plurality of phoneme sequences include the phoneme sequence matching the wake-up word, wherein the second neural network model is trained based on a plurality of sample voices and phoneme sequences corresponding to each sample voice.

In some embodiments, to determine the recognition result by recognizing the second detected voice, and determine the user intention based on the recognition result, the executing and outputting module 153 is specifically configured to:

acquire a text corresponding to the second detected voice by inputting the second detected voice into a voice recognition model; and acquire a target operation category corresponding to the text, each keyword in the text, and a keyword category corresponding to each keyword by inputting the text into a third neural network model;

wherein the third neural network model is trained based on a plurality of text instructions and labeled information of each text instruction, the labeled information including various keywords in the text instructions, a keyword category corresponding to each keyword, and an operation category corresponding to each keyword category.

In some embodiments, to control, based on the user intention, the avatar to output the feedback information, the executing and outputting module 153 is specifically configured to:

determine operation parameters based on the keywords under the target keyword category, and control the avatar based on the operation parameters, the target keyword category being a keyword category related to the target operation category; and output feedback information in the live streaming room by the avatar, the feedback information being intended to characterize an execution result of the operation.

In some embodiments, to output the feedback information in the live streaming room by the avatar, the executing and outputting module 153 is specifically configured to:

output a feedback short message by the avatar in the designated short message output area on the live streaming room interface; and output a feedback voice in the live streaming room using a designated timbre configured for the avatar.

With respect to the apparatus in the above embodiment, details of performing operations of each module have been described in detail in the embodiment of the method, which are not described in detail herein.

By the human-computer interaction apparatus according to the embodiment of the present disclosure, the interestingness of human-computer interaction in the social interaction client is improved by voice based on the combination of the avatar and the user.

Figure 6:
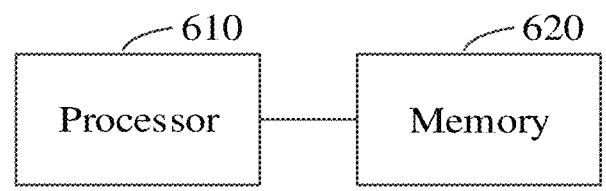
FIG. 6 is a block diagram of an electronic device according to an embodiment of the present disclosure.

FIG. 6 is a block diagram of an electronic device according to an embodiment of the present disclosure. As shown in FIG. 6, the electronic device includes:

a processor 610; and a memory 620 configured to store at least one instruction executable by the processor 610;

wherein the processor 610, when executing the at least one instruction, is enabled to perform the following steps:

detecting a voice input, and determining whether a first detected voice includes a wake-up word, the wake-up word being intended to wake up an avatar in the social interaction client;

displaying the avatar on a live streaming room interface provided by the social interaction client, in response to the wake-up word in the first detected voice;

continuing to detect a voice input, determining a recognition result by recognizing a second detected voice;

determining a user intention based on the recognition result; and

Controlling, based on the user intention, the avatar to output feedback information.

In some embodiments, the processor 610, when executing the at least one instruction, is enabled to perform the following steps:

acquiring a plurality of phoneme sequences by inputting the first detected voice into a second neural network model, the plurality of phoneme sequences being formed by permutations and combinations of individual phonemes; and determining that the first detected voice includes the wake-up word in response to detecting that the plurality of phoneme sequences include a phoneme sequence matching the wake-up word, wherein the second neural network model is trained based on a plurality of sample voices and phoneme sequences corresponding to each sample voice.

In some embodiments, the processor 610, when executing the at least one instruction, is enabled to perform at least one of the following steps:

outputting a short message of the avatar in a designated short message output area on the live streaming room interface, the short message being intended to respond to the wake-up word; or outputting a voice of the avatar in the live streaming room using a designated timbre configured for the avatar, the voice of the avatar being intended to respond to the wake-up word; or outputting the voice and the short message of the avatar.

In some embodiments, the processor 610, when executing the at least one instruction, is enabled to perform the following steps:

opening a voice pickup function, and detecting whether a voice endpoint appears during the voice pickup process, the voice endpoint being intended to indicate the end of a voice; and terminating the voice pickup in response to detecting the voice endpoint, and determining the second detected voice based on the voice pickup function.

In some embodiments, the processor 610, when executing the at least one instruction, is enabled to perform the following steps:

detecting whether a silent segment longer than a preset duration appears during the voice pickup process;

detecting whether a third voice includes a complete sentence in response to detecting that the silent segment longer than the preset duration appears during the voice pickup process; and determining that the voice endpoint appears in response to detecting that the third voice includes a complete sentence;

wherein the third voice is a voice picked up before the silent segment.

In some embodiments, the processor 610, when executing the at least one instruction, is enabled to perform the following steps:

acquiring an output result by inputting the third voice to a first neural network model to, the output result being intended to indicate whether the third voice includes a complete sentence;

wherein the first neural network model is trained based on a plurality of sample voices and labeled information of each sample voice, the labeled information being intended to characterize whether the sentence corresponding to each sample voice is complete.

In some embodiments, the processor 610, when executing the at least one instruction, is enabled to perform the following steps:

acquiring a text corresponding to the second detected voice by inputting the second detected voice into a voice recognition model; and acquire a target operation category corresponding to the text, each keyword in the text, and a keyword category corresponding to each keyword by inputting the text into a third neural network model;

wherein the third neural network model is trained based on a plurality of text instructions and labeled information of each text instruction, the labeled information including various keyword in the text instructions, a keyword category corresponding to each keyword, and an operation category corresponding to each keyword category.

In some embodiments, the processor 610, when executing the at least one instruction, is enabled to perform the following steps:

determining operation parameters based on the keywords under the target keyword category, and controlling the avatar based on the operation parameters, the target keyword category being a keyword category related to the target operation category; and outputting feedback information in the live streaming room by the avatar, the feedback information being intended to characterize an execution result of the operation.

In some embodiments, the processor 610, when executing the at least one instruction, is enabled to perform the following steps:

outputting a feedback short message by the avatar in the designated short message output area on the live streaming room interface; and outputting a feedback voice in the live streaming room using a designated timbre configured for the avatar.

In some embodiments, the processor 610, when executing the at least one instruction, is enabled to perform the following steps:

outputting recommendation information by the avatar in response to satisfying a recommendation condition; and detecting a voice input, and performing, based on a fourth detected voice, an executable operation matching the recommendation information;

wherein the fourth voice includes a voice that an anchor accepts a recommendation;

and wherein the recommendation condition includes: a live streaming room function that the anchor has never used existing in the social interaction client; or the current time being the time when the anchor uses the live streaming service.

In some embodiments, the processor 610, when executing the at least one instruction, is enabled to perform the following steps:

hiding the avatar on the live streaming room interface based on a fifth detected voice, the fifth detected voice including a voice that an anchor does not accept a recommendation.

In some embodiments, the processor 610, when executing the at least one instruction, is enabled to perform the following steps:

playing the interactive voice designated for the avatar and corresponding to the interaction condition in the live streaming room;

outputting an interactive short message by the avatar in a designated short message output area on the live streaming room interface, the interactive short message corresponding to the interaction condition; and playing an interactive animation of the avatar in the live streaming room, the interactive animation corresponding to the interaction condition;

wherein the interaction conditions include, but not limited to, the following cases: a wake-up word to wake up the avatar is received; a voice that the anchor does not accept a recommendation is detected after the recommendation information is output; and a virtual gift presented by the audience user in the live streaming room is received.

Figure 7:
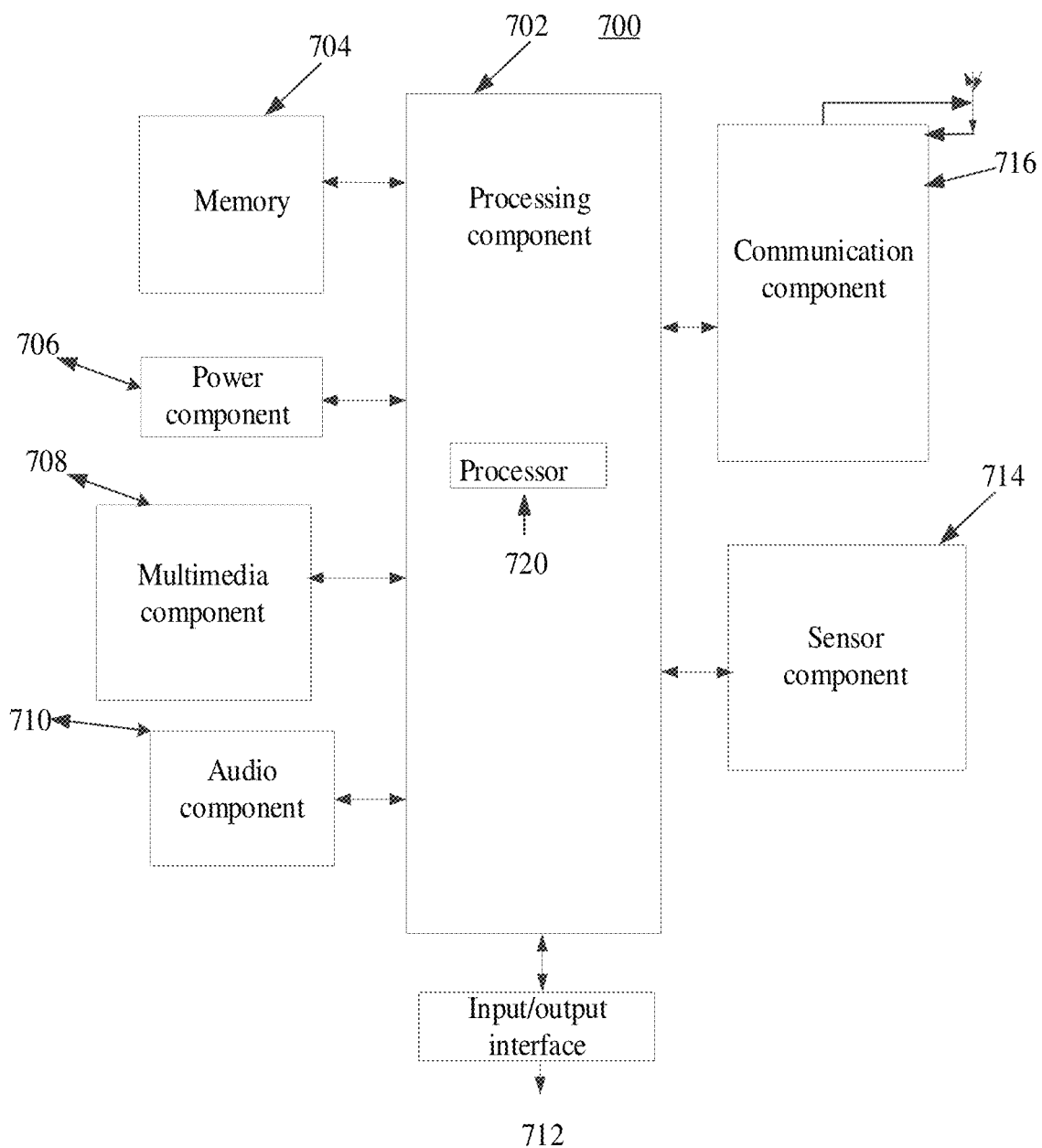
FIG. 7 is a block diagram of a human-computer interaction apparatus according to an embodiment of the present disclosure.

FIG. 7 is a block diagram of a human-computer interaction apparatus 700 according to an embodiment of the present disclosure. For example, the apparatus 700 may be a smart phone, a tablet device, a notebook computer, a desktop computer, an entertainment device, a game device, a medical device, a fitness device, a personal digital assistant, or the like.

Referring to FIG. 7, the apparatus 700 may include one or more following components: a processing component 702, a memory 704, a power source component 706, a multimedia component 708, an audio component 710, an input/output (I/O) interface 712, a sensor component 714 and a communication component 716.

The processing component 702 typically controls overall operations of the aircraft 700, such as the operations associated with display, telephone calls, data communications, camera operations, and recording operations. The processing component 702 may include one or more processors 820 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the apparatus 700. Examples of such data include instructions for any applications or methods operated on the apparatus 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the apparatus 700. The power component 706 may include a power management system, one or more power sources, and any other components associated with the generation, management, and distribution of power in the apparatus 700.

The multimedia component 708 includes a screen providing an output interface between the apparatus 700 and a user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or slip action. In some embodiments, the multimedia component 708 includes a front camera and/or a rear camera. The front camera and/or the rear camera may receive an external multimedia datum while the apparatus 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone ("MIC") configured to receive an external audio signal when the apparatus 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like.

The buttons may include, but are not limited to, a home button, a volume button, a starting button, and a locking button.

The sensor component 714 includes one or more sensors to provide status assessments of various aspects of the apparatus 700. For instance, the sensor component 714 may detect an open/closed status of the apparatus 700, relative positioning of components, e.g., the display and the keypad, of the apparatus 700, a change in position of the apparatus 700 or a component of the apparatus 700, a presence or absence of user contact with the apparatus 700, an orientation or an acceleration/deceleration of the apparatus 700, and a change in temperature of the apparatus 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the apparatus 700 and other devices. The apparatus 700 can access a wireless network based on a communication standard, such as Wi-Fi, 2G, or 3G, or 4G or 5G or a combination thereof. In one embodiment, the communication component 716 receives a broadcast signal or broadcast associated information from an external broadcast management system via a broadcast channel In one embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In embodiments, the apparatus 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described human-computer interaction methods.

In an embodiment, a storage medium including at least one instruction is provided, for example, the memory 704. The at least one instruction, when executed by the processor 820 in the apparatus 700, enables the processor 820 to perform the following steps:

detecting a voice input, and determining whether a first detected voice includes a wake-up word, the wake-up word being intended to wake up an avatar in the social interaction client;

displaying the avatar on a live streaming room interface provided by the social interaction client, in response to determining that the first detected voice includes the wake-up word;

continuing to detect a voice input, and determining a recognition result by recognizing a second detected voice;

determining a user intention based on the recognition result; and controlling, based on the user intention, the avatar to output feedback information.

In some embodiments, the at least one instruction, when executed by a processor, enables the processor to perform the following steps:

acquiring a plurality of phoneme sequences by inputting the first detected voice into a second neural network model, the plurality of phoneme sequences being formed by permutations and combinations of individual phonemes; and determining that the first detected voice includes the wake-up word in response to detecting that the plurality of phoneme sequences include a phoneme sequence matching the wake-up word, wherein the second neural network model is trained based on a plurality of sample voices and phoneme sequences corresponding to each sample voice.

In some embodiments, the at least one instruction, when executed by a processor, enables the processor to perform the following steps:

outputting a short message of the avatar in a designated short message output area on the live streaming room interface, the short message being intended to respond to the wake-up word; or, outputting a voice of the avatar in the live streaming room using a designated timbre configured for the avatar, the voice of the avatar being intended to respond to the wake-up word; or, outputting the voice and the short message of the avatar.

In some embodiments, the at least one instruction, when executed by a processor, enables the processor to perform the following steps:

opening a voice pickup function, and detecting whether a voice endpoint appears during the voice pickup process, the voice endpoint being intended to indicate the end of a voice; and terminating the voice pickup in response to detecting the voice endpoint, and determining the second detected voice based on the voice pickup function.

In some embodiments, the at least one instruction, when executed by a processor, enables the processor to perform the following steps:

detecting whether a silent segment longer than a preset duration appears during the voice pickup process;

detecting whether a third voice includes a complete sentence in response to detecting that the silent segment longer than the preset duration appears during the voice pickup process; and determining that the voice endpoint appears in response to detecting that the third voice includes a complete sentence;

wherein the third voice is a voice picked up before the silent segment.

In some embodiments, the at least one instruction, when executed by a processor, enables the processor to perform the following steps:

acquiring an output result by inputting the third voice to a first neural network model, the output result being intended to indicate whether the third voice includes a complete sentence;

wherein the first neural network model is trained based on a plurality of sample voices and labeled information of each sample voice, the labeled information being intended to characterize whether the sentence corresponding to each sample voice is complete.

In some embodiments, the at least one instruction, when executed by a processor, enables the processor to perform the following steps:

acquiring a text corresponding to the second detected voice by inputting the second detected voice into a voice recognition model; and acquire a target operation category corresponding to the text, each keyword in the text, and a keyword category corresponding to each keyword by inputting the text into a third neural network model;

wherein the third neural network model is trained based on a plurality of text instructions and labeled information of each text instruction, the labeled information including various keywords in the sample text instructions, a keyword category corresponding to each keyword, and an operation category corresponding to each keyword category.

In some embodiments, the at least one instruction, when executed by a processor, enables the processor to perform the following steps:

determining operation parameters based on the keywords under the target keyword category, and controlling the avatar based on the operation parameters, the target keyword category being a keyword category related to the target operation category; and outputting feedback information in the live streaming room by the avatar, the feedback information being intended to characterize an execution result of the operation.

In some embodiments, the at least one instruction, when executed by a processor, enables the processor to perform the following steps:

outputting a feedback short message by the avatar in the designated short message output area on the live streaming room interface; and outputting a feedback voice in the live streaming room using a designated timbre configured for the avatar.

In some embodiments, the at least one instruction, when executed by a processor, enables the processor to perform the following steps:

outputting recommendation information by the avatar in response to satisfying a recommendation condition; and detecting a voice input, and performing, based on a fourth detected voice, an executable operation matching the recommendation information;

wherein the fourth detected voice includes a voice that an anchor accepts a recommendation; and wherein the recommendation condition includes: a live streaming room function that the anchor has never used existing in the social interaction client; or the current time being the time when the anchor uses the live streaming service.

In some embodiments, the at least one instruction, when executed by a processor, enables the processor to perform the following step:

hiding the avatar on the live streaming room interface based on a fifth detected voice, the fifth detected voice including a voice that an anchor does not accept a recommendation.

In some embodiments, the at least one instruction, when executed by a processor, enables the processor to perform the following steps:

playing the interactive voice designated for the avatar and corresponding to the interaction condition in the live streaming room;

outputting an interactive short message by the avatar in a designated short message output area on the live streaming room interface, the interactive short message corresponding to the interaction condition; and playing an interactive animation of the avatar in the live streaming room, the interactive animation corresponding to the interaction condition;

wherein the interaction conditions include but are not limited to the following cases: a wake-up word to wake up the avatar is received; a voice that the anchor does not accept a recommendation is detected after the recommendation information is output; and a virtual gift presented by the audience user in the live streaming room is received.

In some embodiments, the storage medium may be a non-transitory computer-readable storage medium, such as a ROM, a RAM, a CD-ROM, a magnetic tape, a floppy disc, an optical data storage device, or the like.

In an embodiment, a computer program product is provided. The computer program product, when running on a processor of an electronic device, enables the electronic device to perform the following steps:

detecting a voice input, and determining whether a first detected voice includes a wake-up word, the wake-up word being intended to wake up an avatar in the social interaction client;

displaying the avatar on a live streaming room interface provided by the social interaction client, in response to determining that the first detected voice includes the wake-up word;

continuing to detect a voice input, and determining a recognition result by recognizing a second detected voice;

determining a user intention based on the recognition result; and controlling, based on the user intention, the avatar to output feedback information.

In some embodiments, the computer program product, when running on a processor of an electronic device, enables the electronic device to perform the following steps:

acquiring a plurality of phoneme sequences by inputting the first detected voice into a second neural network model, the plurality of phoneme sequences being formed by permutations and combinations of individual phonemes; and determining that the first detected voice including the wake-up word in response to detecting that the plurality of phoneme sequences include a phoneme sequence matching the wake-up word, wherein the second neural network model is trained based on a plurality of sample voices and phoneme sequences corresponding to each sample voice.

In some embodiments, the computer program product, when running on a processor of an electronic device, enables the electronic device to perform at least one of the following steps:

outputting a short message of the avatar in a designated short message output area on the live streaming room interface, the short message being intended to respond to the wake-up word; or outputting a voice of the avatar in the live streaming room using a designated timbre configured for the avatar, the voice of the avatar being intended to respond to the wake-up word; or outputting the voice and the short message of the avatar.

In some embodiments, the computer program product, when running on a processor of an electronic device, enables the electronic device to perform the following steps:

opening a voice pickup function, and detecting whether a voice endpoint appears during the voice pickup process, the voice endpoint being intended to indicate the end of a voice; and terminating the voice pickup in response to detecting the voice endpoint, and determining the second detected voice based on the voice pickup function.

In some embodiments, the computer program product, when running on a processor of an electronic device, enables the electronic device to perform the following steps:

detecting whether a silent segment longer than a preset duration appears during the voice pickup process;

detecting whether a third voice includes a complete sentence in response to detecting that the silent segment longer than the preset duration appears during the voice pickup process; and determining that the voice endpoint appears in response to detecting that the third voice includes a complete sentence;

wherein the third voice is a voice picked up before the silent segment.

In some embodiments, the computer program product, when running on a processor of an electronic device, enables the electronic device to perform the following step:

acquiring an output result by inputting the third voice to a first neural network model, the output result being intended to indicate whether the third voice includes a complete sentence;

wherein the first neural network model is trained based on a plurality of sample voices and labeled information of each sample voice, the labeled information being intended to characterize whether the sentence corresponding to each sample voice is complete.

In some embodiments, the computer program product, when running on a processor of an electronic device, enables the electronic device to perform the following steps:

acquiring a text corresponding to the second detected voice by inputting the second detected voice into a voice recognition model; and acquiring a target operation category corresponding to the text, each keyword in the text, and a keyword category corresponding to each keyword by inputting the text into a third neural network model;

wherein the third neural network model is trained based on a plurality of text instructions and labeled information of each text instruction, the labeled information including various keywords in the text instructions, a keyword category corresponding to each keyword, and an operation category corresponding to each keyword category.

In some embodiments, the computer program product, when running on a processor of an electronic device, enables the electronic device to perform the following steps:

determining operation parameters based on the keywords under the target keyword category, and controlling the avatar based on the operation parameters, the target keyword category being a keyword category related to the target operation category; and outputting feedback information in the live streaming room by the avatar, the feedback information being intended to characterize an execution result of the operation.

In some embodiments, the computer program product, when running on a processor of an electronic device, enables the electronic device to perform the following steps:

outputting a feedback short message by the avatar in the designated short message output area on the live streaming room interface; and outputting a feedback voice in the live streaming room using a designated timbre configured for the avatar.

In some embodiments, the computer program product, when running on a processor of an electronic device, enables the electronic device to perform the following steps:

outputting recommendation information by the avatar in response to satisfying a recommendation condition; and detecting a voice input, and performing, based on a fourth detected voice, an executable operation matching the recommendation information;

wherein the fourth voice includes a voice that an anchor accepts a recommendation; and wherein the recommendation condition includes: a live streaming room function that the anchor has never used existing in the social interaction client; or the current time being the time when the anchor uses the live streaming service.

In some embodiments, the computer program product, when running on a processor of an electronic device, enables the electronic device to perform the following step:

hiding the avatar on the live streaming room interface based on a fifth detected voice, the fifth detected voice including a voice that an anchor does not accept a recommendation.

In some embodiments, the computer program product, when running on a processor of an electronic device, enables the electronic device to perform the following steps:

playing an interactive voice designated for the avatar and corresponding to the interaction condition in the live streaming room;

outputting an interactive short message by the avatar in a designated short message output area on the live streaming room interface, the interactive short message corresponding to the interaction condition; and playing an interactive animation of the avatar in the live streaming room, the interactive animation corresponding to the interaction condition;

wherein interaction conditions include but are not limited to the following cases: a wake-up word to wake up the avatar is received; a voice that the anchor does not accept a recommendation is detected after the recommendation information is output; and a virtual gift presented by the audience user in the live streaming room is received.

Other embodiments of the present disclosure would be apparent to those skilled in the art from consideration of the description and practice of the present disclosure. The present disclosure is intended to cover any variations, uses, or adaptations of the present disclosure following the general principles thereof and including common knowledge or commonly used technical measures which are not disclosed herein. The description and embodiments are to be considered as example only, with a true scope and spirit of the present disclosure being indicated by the following claims.

It would be appreciated that the present disclosure is not limited to the exact construction that has been described above and illustrated in the accompanying drawings, and that various modifications and changes can be made without departing from the scope thereof. The scope of the present disclosure can be defined by the appended claims.

What is claimed is:

1. A human-computer interaction method, applicable to a social interaction client, comprising:

detecting a voice input, and determining whether a first detected voice comprises a wake-up word, the wake-up word being intended to wake up an avatar in the social interaction client;

displaying the avatar on a live streaming room interface provided by the social interaction client, in response to determining that the first detected voice comprises the wake-up word;

continuing to detect a voice input, and determining a recognition result by recognizing a second detected voice;

determining a user intention based on the recognition result; and controlling, based on the user intention, the avatar to output feedback information, wherein the method further comprises:

in a case that the avatar is not actively awakened by an anchor, outputting recommendation information by the avatar in response to satisfying a recommendation condition, wherein the recommendation condition comprises: the anchor having never used a live streaming room function in the social interaction client; or the current time being the time when the anchor often used the live streaming service.

2. The method according to claim 1, wherein determining whether the first detected voice comprises the wake-up word comprises:
acquiring a plurality of phoneme sequences by inputting the first detected voice to a second neural network model, the plurality of phoneme sequences being formed by permutations and combinations of individual phonemes corresponding to the first detected voice; and
determining that the first detected voice comprises the wake-up word in response to detecting that the plurality of phoneme sequences comprises a phoneme sequence matching the wake-up word;
wherein the second neural network model is trained based on a plurality of sample voices and phoneme sequences corresponding to each sample voice.

3. The method according to claim 1, further comprising:
outputting a short message of the avatar in a designated short message output area on the live streaming room interface, the short message being intended to respond to the wake-up word; or
outputting a voice of the avatar in a live streaming room using a designated timbre configured for the avatar, the voice of the avatar being intended to respond to the wake-up word; or
outputting the voice and the short message of the avatar.

4. The method according to claim 1, wherein continuing to detect the voice input comprises:
opening a voice pickup function, and detecting whether a voice endpoint appears, the voice endpoint being intended to indicate the end of a voice; and
terminating the voice pickup in response to detecting the voice endpoint, and determining the second detected voice based on the voice pickup function.

5. The method according to claim 4, wherein detecting whether the voice endpoint appears comprises:
detecting whether a silent segment longer than a preset duration appears;
detecting whether a third voice comprises a complete sentence in response to detecting that that the silent segment longer than the preset duration appears; and
determining that the voice endpoint appears in response to detecting that the third voice comprises a complete sentence;
wherein the third voice is a voice picked up before the silent segment.

6. The method according to claim 5, detecting whether the third voice comprises a complete sentence comprises:
acquiring an output result by inputting the third voice to a first neural network model, the output result being intended to indicate whether the third voice comprises a complete sentence;
wherein the first neural network model is trained based on a plurality of sample voices and labeled information of each sample voice, the labeled information being intended to characterize whether a sentence corresponding to each sample voice is complete.

7. The method according to claim 1, wherein determining the recognition result by recognizing the second detected voice comprises:
acquiring a text corresponding to the second detected voice by inputting the second detected voice into a voice recognition model; and acquire a target operation category corresponding to the text, each keyword in the text, and a keyword category corresponding to each keyword by inputting the text into a third neural network model;
wherein the third neural network model is trained based on a plurality of text instructions and labeled information of each text instruction, the labeled information comprising various keywords in the text instructions, a keyword category corresponding to each keyword, and an operation category corresponding to each keyword category.

8. The method according to claim 7, wherein controlling, based on the user intention, the avatar to output the feedback information comprises:
determining operation parameters based on the keywords under the target keyword category, and controlling the avatar based on the operation parameters, the target keyword category being a keyword category related to the target operation category; and
outputting feedback information in the live streaming room by the avatar, the feedback information being intended to characterize an execution result of the operation.

9. The method according to claim 8, wherein outputting the feedback information in the live streaming room by the avatar comprises at least one of:
outputting a feedback short message by the avatar in the designated short message output area on the live streaming room interface; and
outputting a feedback voice in the live streaming room using a designated timbre configured for the avatar.

10. The method according to claim 8, wherein the keyword category corresponding to each keyword is determined according to meanings of the keyword and an object characterized by the keyword.

11. The method according to claim 1, further comprising:
detecting a voice input, and performing, based on a fourth detected voice, an executable operation matching the recommendation information;
wherein the fourth detected voice comprises a voice recommended by the anchor.

12. The method according to claim 11, further comprising:
hiding the avatar on the live streaming room interface based on a fifth detected voice, the fifth detected voice comprising a voice that the anchor does not accept a recommendation.

13. The method according to claim 1, wherein in response of satisfying an interaction condition, the method comprises:
playing an interactive voice designated for the avatar and corresponding to the interaction condition in the live streaming room;
outputting an interactive short message by the avatar in the designated short message output area on the live streaming room interface, the interactive short message corresponding to the interaction condition; and
playing an interactive animation of the avatar in the live streaming room, the interactive animation corresponding to the interaction condition;
wherein the interaction conditions comprise the following cases: a wake-up word to wake up the avatar is received; a voice that the anchor does not accept a recommendation is detected after the recommendation information is output; and a virtual gift presented by an audience user in the live streaming room is received.

14. The method according to claim 1, wherein determining whether the first detected voice comprises the wake-up word comprises:
- converting the first detected voice into a text; and
- determining that the first detected voice comprises the wake-up word in response to detecting that the text contains a subtext corresponding to the wake-up word.

15. An electronic device, comprising:
- a processor;
- a memory configured to store at least one instruction executable by the processor;
- wherein the at least one instruction, when executed by the processor, causes the processor to perform a method comprising:
- detecting a voice input, and determining whether a first detected voice comprises a wake-up word, the wake-up word being intended to wake up an avatar in the social interaction client;
- displaying the avatar on a live streaming room interface provided by the social interaction client, in response to determining that the first detected voice comprises the wake-up word;
- continuing to detect a voice input, and determining a recognition result by recognizing a second detected voice;
- determining a user intention based on the recognition result; and
- controlling, based on the user intention, the avatar to output feedback information,
- wherein the method further comprises:
- in a case that the avatar is not actively awakened by an anchor, outputting recommendation information by the avatar in response to satisfying a recommendation condition, wherein the recommendation condition comprises: the anchor having never used a live streaming room function in the social interaction client; or the current time being the time when the anchor often used the live streaming service.

16. A non-transitory computer-readable medium storing at least one instruction therein, wherein the at least one instruction, when executed by a processor of an electronic device, causes the electronic device to perform a method comprising:
- detecting a voice input, and determining whether a first detected voice comprises a wake-up word, the wake-up word being intended to wake up an avatar in the social interaction client;
- displaying the avatar on a live streaming room interface provided by the social interaction client, in response to determining that the first detected voice comprises the wake-up word;
- continuing to detect a voice input, and determining a recognition result by recognizing a second detected voice;
- determining a user intention based on the recognition result; and
- controlling, based on the user intention, the avatar to output feedback information,
- wherein the method further comprises:
- in a case that the avatar is not actively awakened by an anchor, outputting recommendation information by the avatar in response to satisfying a recommendation condition, wherein the recommendation condition comprises: the anchor having never used a live streaming room function in the social interaction client; or the current time being the time when the anchor often used the live streaming service.

* * * * *